US008707168B2

(12) United States Patent
Hargarten et al.

(10) Patent No.: US 8,707,168 B2
(45) Date of Patent: Apr. 22, 2014

(54) GENERATING FINANCIAL DATA DOCUMENTS USING TEMPLATES

(75) Inventors: Christopher S. Hargarten, Seattle, WA (US); Monique H. Ozoux-Dean, Seattle, WA (US); Ning Sun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 257 days.

(21) Appl. No.: 13/222,425

(22) Filed: Aug. 31, 2011

(65) Prior Publication Data

US 2011/0314364 A1    Dec. 22, 2011

Related U.S. Application Data

(63) Continuation of application No. 12/351,169, filed on Jan. 9, 2009, now Pat. No. 8,032,829, which is a continuation of application No. 10/985,580, filed on Nov. 10, 2004, now Pat. No. 7,487,446.

(51) Int. Cl.
G06F 17/00    (2006.01)

(52) U.S. Cl.
USPC ........................................................ 715/249

(58) Field of Classification Search
USPC .................................. 715/249, 255; 705/1.1
See application file for complete search history.

(56) References Cited

U.S. PATENT DOCUMENTS

| | | | | |
|---|---|---|---|---|
| 5,652,842 A | * | 7/1997 | Siegrist et al. | 705/2 |
| 5,652,850 A | * | 7/1997 | Hollander | 715/744 |
| 5,761,650 A | | 6/1998 | Munsil et al. | |
| 5,832,460 A | * | 11/1998 | Bednar et al. | 705/27.2 |
| 5,909,673 A | * | 6/1999 | Gregory | 705/45 |
| 5,963,925 A | * | 10/1999 | Kolling et al. | 705/40 |
| 6,088,711 A | | 7/2000 | Fein et al. | 715/269 |
| 6,094,505 A | | 7/2000 | Lech et al. | 382/180 |
| 6,195,665 B1 | * | 2/2001 | Jarett | 715/251 |
| 6,249,770 B1 | * | 6/2001 | Erwin et al. | 725/35 |
| 6,668,255 B2 | | 12/2003 | Mielenhausen | |
| 6,748,367 B1 | * | 6/2004 | Lee | 705/66 |
| 6,934,905 B1 | | 8/2005 | Tighe | 715/209 |
| 6,985,922 B1 | | 1/2006 | Bashen et al. | |
| 7,107,229 B1 | | 9/2006 | Sullivan | 705/36 R |
| 7,131,063 B2 | | 10/2006 | Mateos | |
| 7,155,670 B2 | * | 12/2006 | Takizawa et al. | 715/239 |
| 7,421,648 B1 | | 9/2008 | Davis | 715/234 |

(Continued)

FOREIGN PATENT DOCUMENTS

EP    1447754    8/2004

OTHER PUBLICATIONS

Examiner's Report dated Jan. 10, 2013 in Canadian Appln. Serial No. 2,522,673, filed Oct. 7, 2005. 3 pgs.
European Search Report for EP 05109734 dated Feb. 22, 2006.

(Continued)

*Primary Examiner* — Laurie Ries
(74) *Attorney, Agent, or Firm* — Damon Rieth; Jim Ross; Micky Minhas

(57) ABSTRACT

A computing system is disclosed including a computer processor configured to receive a selection of a template and identify a data field in the template. The data field indicates financial data to fill in the data field. The computer processor is configured to retrieve the financial data for the data field from stored financial data and generate a document according to the selected template. The generated document has the financial data within the data field.

20 Claims, 7 Drawing Sheets

(56) References Cited

U.S. PATENT DOCUMENTS

| | | | |
|---|---|---|---|
| 7,487,446 B2 | 2/2009 | Hargarten | |
| 7,822,769 B2* | 10/2010 | Rohan et al. | 707/777 |
| 7,836,394 B2* | 11/2010 | Linder | 715/234 |
| 8,032,829 B2 | 10/2011 | Hargarten | 715/249 |
| 8,055,575 B2* | 11/2011 | Grody et al. | 705/37 |
| 8,185,445 B1* | 5/2012 | Perlmuter | 705/26.1 |
| 2002/0184485 A1 | 12/2002 | Dray et al. | |
| 2003/0004986 A1 | 1/2003 | Lin et al. | |
| 2003/0196167 A1 | 10/2003 | Dewar | 715/507 |
| 2004/0153465 A1 | 8/2004 | Singleton et al. | |
| 2004/0162833 A1 | 8/2004 | Jones et al. | |
| 2004/0221233 A1* | 11/2004 | Thielen | 715/530 |
| 2004/0243938 A1* | 12/2004 | Weise et al. | 715/526 |
| 2005/0102212 A1 | 5/2005 | Roy | 705/36 |
| 2005/0144096 A1 | 6/2005 | Caramanna | 705/30 |
| 2005/0182669 A1 | 8/2005 | Tinnirello et al. | 705/4 |

OTHER PUBLICATIONS

Patent Abstract of Japan for JP 2004192427 published Jul. 8, 2004.

Bourret et al., "A Genetic Load/Extract Utility for Data Transfer between XML Documents and Relational Databases," Proceedings of International Workshop on Advance Issues of E-Commerce and Web-Based Information Systems, 2000, XP002169780.

Furuta, Richard, et al., "Document Formatting Systems: Survey, Concepts, and Issues", ACM Computing Surveys (CSUR), vol. 14, Issue 3, Sep. 1982, pp. 417-472.

Reiss, Steven, "The Desert Environment", ACM Transactions on Software Engineering and Methodology (TOSEM), vol. 8, Issue 4, Oct. 1999, pp. 297-342.

Japanese patent application No. 2005-310228 Notice of Rejection mailed on Jan. 14, 2011. 7 pages.

Prosecution History for U.S. Appl. No. 12/351169: Office Action mailed on Mar. 23, 2011; Amendment dated Jun. 6, 2011; Notice of Allowance dated Jul. 18, 2011.

Prosecution History for U.S. Appl. No. 10/985,580: Preliminary Amendment filed Sep. 12, 2005; Office Action mailed Jun. 22, 2007; Amendment filed Nov. 19, 2007; Final Office Action mailed Feb. 20, 2008; Amendment filed with RCE on Aug. 20, 2008; Notice of Allowance mailed on Sep. 19, 2008; Issue Notification mailed on Jan. 14, 2009.

Interrogation, with English translation, for Japanese Appeal No. 2012-005919 (Japanese Patent Application No. 2005-310228), dated Sep. 25, 2012, 12 pages.

Notice of Preliminary Rejection from Korean Patent Application No. 10-2005-0087797, dated Apr. 2, 2012, 5 pages.

* cited by examiner

GENERATING FINANCIAL DATA DOCUMENTS USING TEMPLATES

The present application is a continuation of and claims priority of U.S. patent application Ser. No. 12/351,169, filed Jan. 9, 2009, which is a continuation of and claims priority of U.S. patent application Ser. No. 10/985,580, filed Nov. 10, 2004, the contents of both applications are hereby incorporated by reference in their entirety.

BACKGROUND

Computerized accounting systems have grown in popularity in the past decade. The traditional system of double entry accounting has been a natural process to be adapted to computers. As a result of accounting data being in a computerized format, more and more reports and information can be gleaned from the accounting data. However, the ability to view the accounting data and related financial documents has often been an afterthought in modern accounting programs. Further, creating a more familiar user interface to enter and modify accounting data without having the user interface mimic the traditional and often confusing ledger pages has been a challenge.

SUMMARY

In one exemplary embodiment, a computing system includes a computer processor configured to receive a selection of a template and identify a data field in the template. The data field indicates financial data to fill in the data field. The computer processor is configured to retrieve the financial data for the data field from stored financial data and generate a document according to the selected template. The generated document has the financial data within the data field.

In one exemplary embodiment, a method includes receiving a selection of a template and identifying a data field in the template. The data field indicates financial data to fill in the data field. The method also includes retrieving the financial data for the data field from stored financial data and generating a word processing program document according to the selected template. The document has the financial data within the data field.

An exemplary method can also include one or more of storing a financial document as a word processing file, allowing a user to modify a word processing program document, allowing the modifications made on the word processing program document to be communicated to a financial program, allowing a user to edit existing templates, allowing a user to create templates, allowing a user to select from a displayed list of data fields to be displayed on the template, allowing a user to open a word processing version of a saved financial document and referring back to the financial program to update the data displayed in the financial document, allowing a user to select to communicate a financial document, recognizing that the financial document has a related template and communicates the document using the template in the word processing program, communicating the document by one of email, fax, a communication link to a printer and a communication link to a storage device and using the word processing program such that the word processing program operates internally and is not visible to the user.

DRAWINGS

FIG. 4 is an illustration of an embodiment of a sample template;

FIG. 7 is an illustration of an embodiment of an email of a template.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
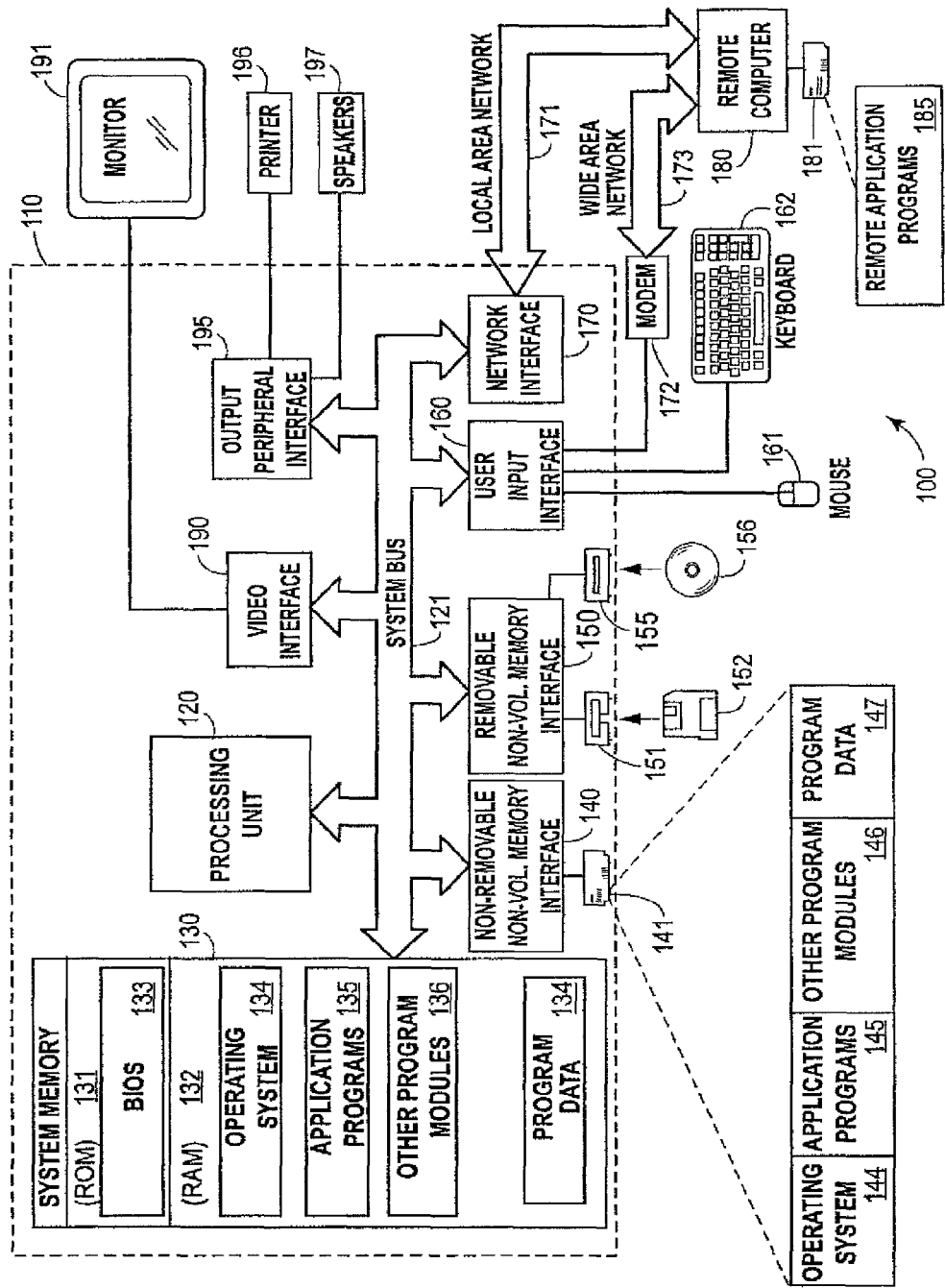
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
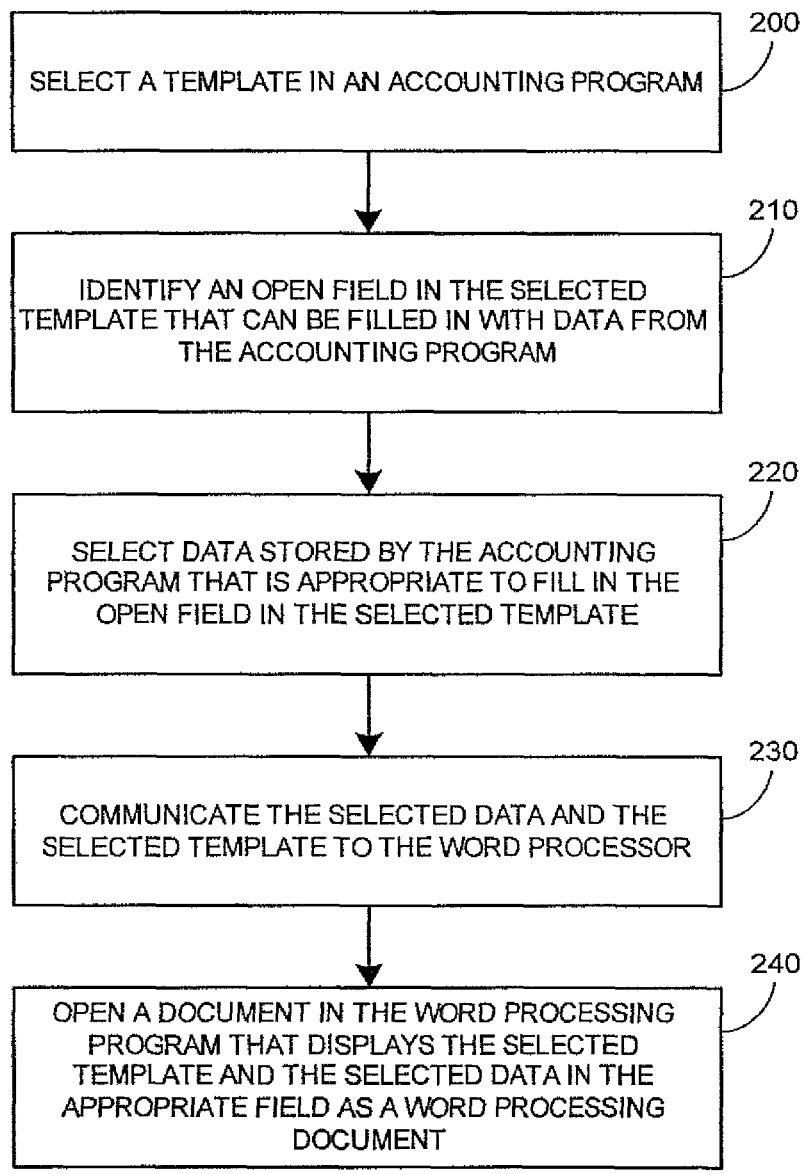
FIG. 2 is flowchart of a method in accordance with the claims.

FIG. 2 is an illustration of a flowchart of steps that may be performed in accordance with the claims. At block 200, a user may select a template in an accounting program. For example, one template may be an invoice template. Other examples of templates may include a sales order template, a quote template, a customer credit memo template, a customer statement template and a purchase order template. Additional templates may be available. In addition, a user may be permitted to create, modify or delete templates as will be discussed in relation to FIG. 5.

Figure 3:
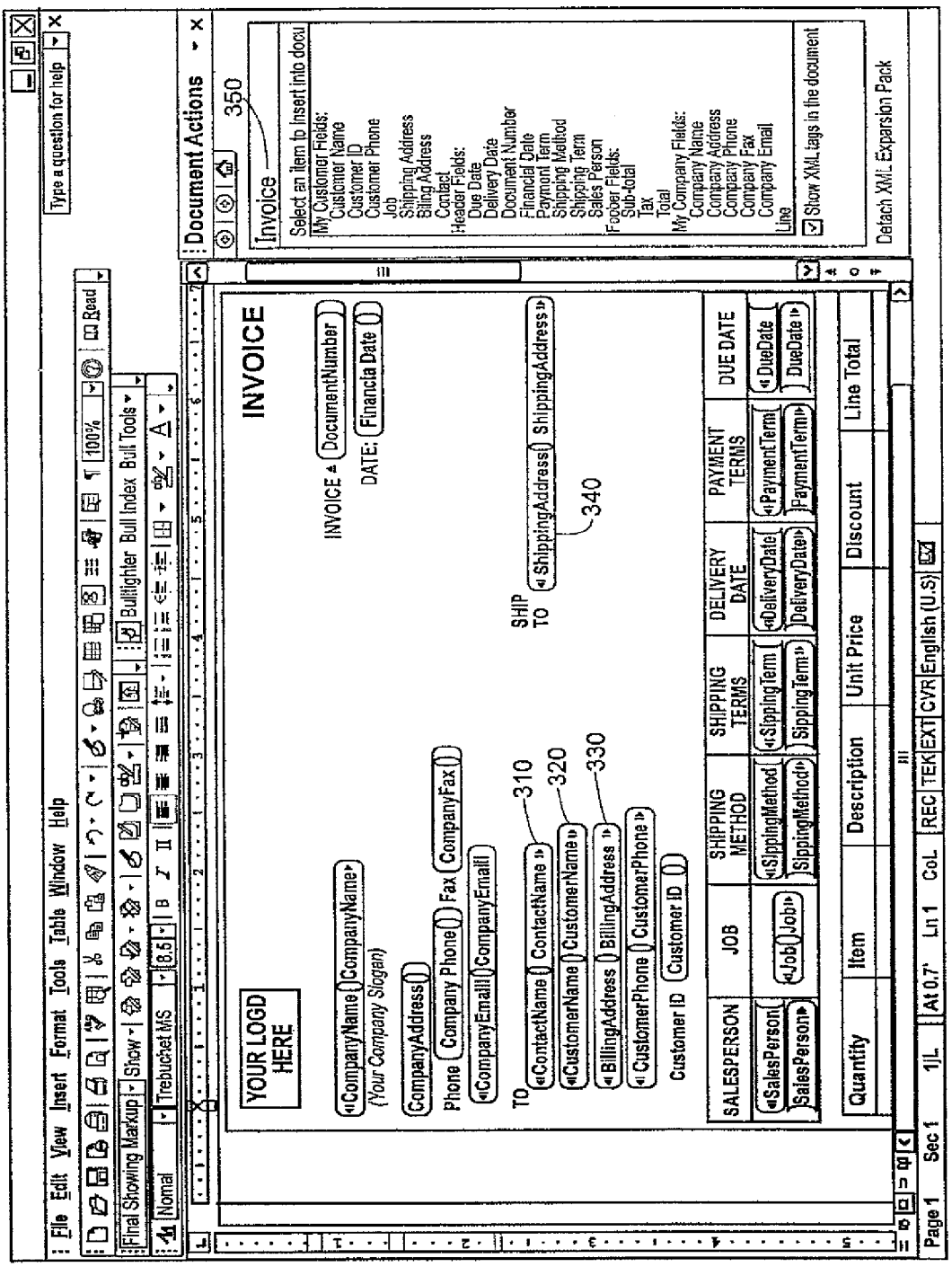
FIG. 3 is an illustration of an embodiment of a sample invoice template.

The template may have a field or many fields related to the selected template. Referring to FIG. 3 which is an illustration of a sample invoice template, ContactName 310 may be a field related to the invoice template. Additionally, CustomerName 320 and BillingAddress 330 may be additional fields. Fields may be placeholders for data that is stored in the accounting software than can be retrieve by the template and displayed in the template. Logically, ContactName 310 field may retrieve the relevant contact name related to the present invoice. Similarly, CustomerName 320 field and BillingAddress 330 field may retrieve the relevant customer name and billing address related to the present invoice from the accounting program. The retrieval of this information may be achieved through the use of SmartDoc technology which may search XML nodes embedded in the template.

Smart documents may be documents in a word processor such Microsoft® Office Word or workbooks in a spreadsheet program such as Microsoft Office Excel that are associated with an XML schema so data in a document, rather than just being a paragraph or range of cells, acquire special meaning. For example, rather than knowing that a paragraph is the second one in the document, it may be much more valuable to know that the paragraph is the one destined to contain a product description. What smart documents may offer is a way to make the host application more responsive to the data in a document or workbook. Smart documents help the data become meaningful to the host application. In this way, the application, such as Word or Excel, may be more than a feature-rich application by becoming contextually aware of what users are producing with those features.

Creating smart document code may be simple and uncomplicated or it can contain thousands of code lines and reach far into a company's enterprise. Smart document solutions may be written using many modern programming systems such as Microsoft Visual Basic® 6.0, Microsoft Visual Basic .NET, Microsoft Visual C#®.NET, or Microsoft Visual C++® development systems. Users may deploy smart documents over a corporate intranet, over the Internet, or through Web sites.

Although a user may create a smart document solution as a dynamic linked library (DLL), a user may also create a smart document solution as an XML file using an XML editor such as a word processor such as Microsoft Notepad or Word. Note that a smart document XML file may be limited to static text, hyperlinks, document fragments, and images. No matter which of the two approaches a user may take, on example of the smart document development cycle may be as follows:

1. Attach an XML schema to a document and associate XML elements with the portions of the document or workbook that will have smart document actions or help content associated with them.

2. Use the smart document API or the smart document XML file schema to write code or XML that displays controls in the Document Actions task pane and takes action when the user interacts with the controls.

3. Store the smart document code and all of the files used by the smart document on a file server or a Web server that your users can access.

4. Create an XML expansion pack manifest file that references all of the files used by the smart document solution.

5. Use the user interface to reference the XML expansion pack manifest file and attach the solution to the document or workbook.

6. Distribute the document or workbook as a template. When a user creates an instance of the document or workbook from the template, the smart document and any supporting files used by the smart document may be downloaded and registered locally on the user's computer without any user intervention.

At block 210, an open field may be identified in the selected template that can be filled in with data from the accounting program. Referring to FIG. 3, ContactName 310 may be a field that may be in the template and may be identified as a field that can be filled in with data from the accounting program. There are a variety of known methods to accomplish this identification such as simply querying the accounting program to determine if a ContactName 310 is stored in relation to the selected invoice.

At block 220, data stored by the accounting program that is appropriate to fill in the open field in the selected template may be selected. This data may be stored as any type of file that will be understood by the word processor, for example, as an XML schema file.

At block 230, the selected data and the selected template may be passed to the word processor. The data stored at block 220 may be passed along with the selected template to the word processor as any type of file that may be understood by the word processor, such as an XML schema file and a template file.

Figure 4:
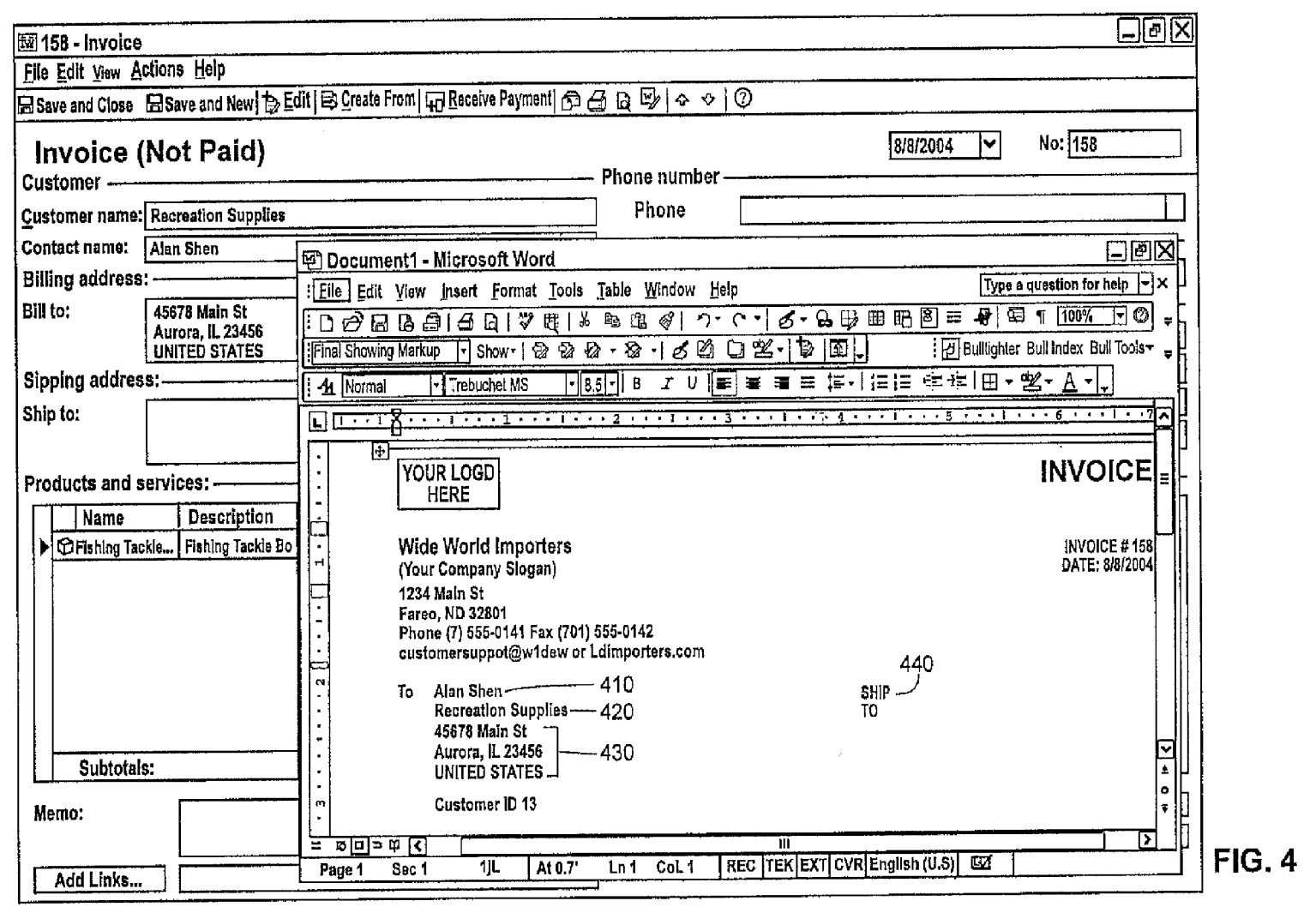

At block 240, a document may be opened in the word processing program and the word processing program may display the selected template and the selected data in the appropriate field. FIG. 4 may be an example of a template that is filled in with relevant data and that is being displayed in a word processor. The CustomerContact 310 field from FIG. 3 may be filled in with the relevant customer contact "Alan Shen" 410, the CustomerName 320 field from FIG. 3 may be filled in with the relevant customer name "Recreation Supplies" 420 and the CustomerAddress filed 330 from FIG. 3 may be filled in with the relevant address "45678 Main St. Aurora, Ill. 23456 UNITED STATES" 430. In addition, fields in which relevant data could not be located remain empty. For example, in FIG. 3 there is a field ShippingAddress 440 and in FIG. 4, the Ship TO address 440 is empty, indicating that a relevant match for the ShippingAddress field 340 was not located in the accounting program.

Again referring to FIG. 4, the resulting document in the word processor may be stored as a word processing document. For example, if the word processor was Microsoft Word, the invoice in FIG. 4 may be saved as a standard Word file with the traditional .doc extension on the file. In addition, the user may be allowed to modify the word processing document. For example, if the user desired to add a personal message at the bottom of the invoice in FIG. 4, the user may be permitted to simply type this message in the invoice. The changes made on word processing document transfer may or may not transfer over to the accounting program depending on the setup of the program and the desires of the user. For example, if a personal note was added to an invoice, such information is not important to the accounting program and the user may select that changes may in the word processing program not be communicated to the accounting program. However, if additional units were added to the invoice, it may be imperative that these additional units be communicated to the accounting program and the user may select that these changes be communicated to the accounting program.

In addition, some users may simply be more comfortable using a word processing type format to enter data in an accounting program. There may be an option for all changes that were made in the word processing program to be automatically communicated to the accounting program, where the changes will be saved in the accounting program. In effect, the word processing program may be a substitute user interface for the accounting program.

Figure 5:
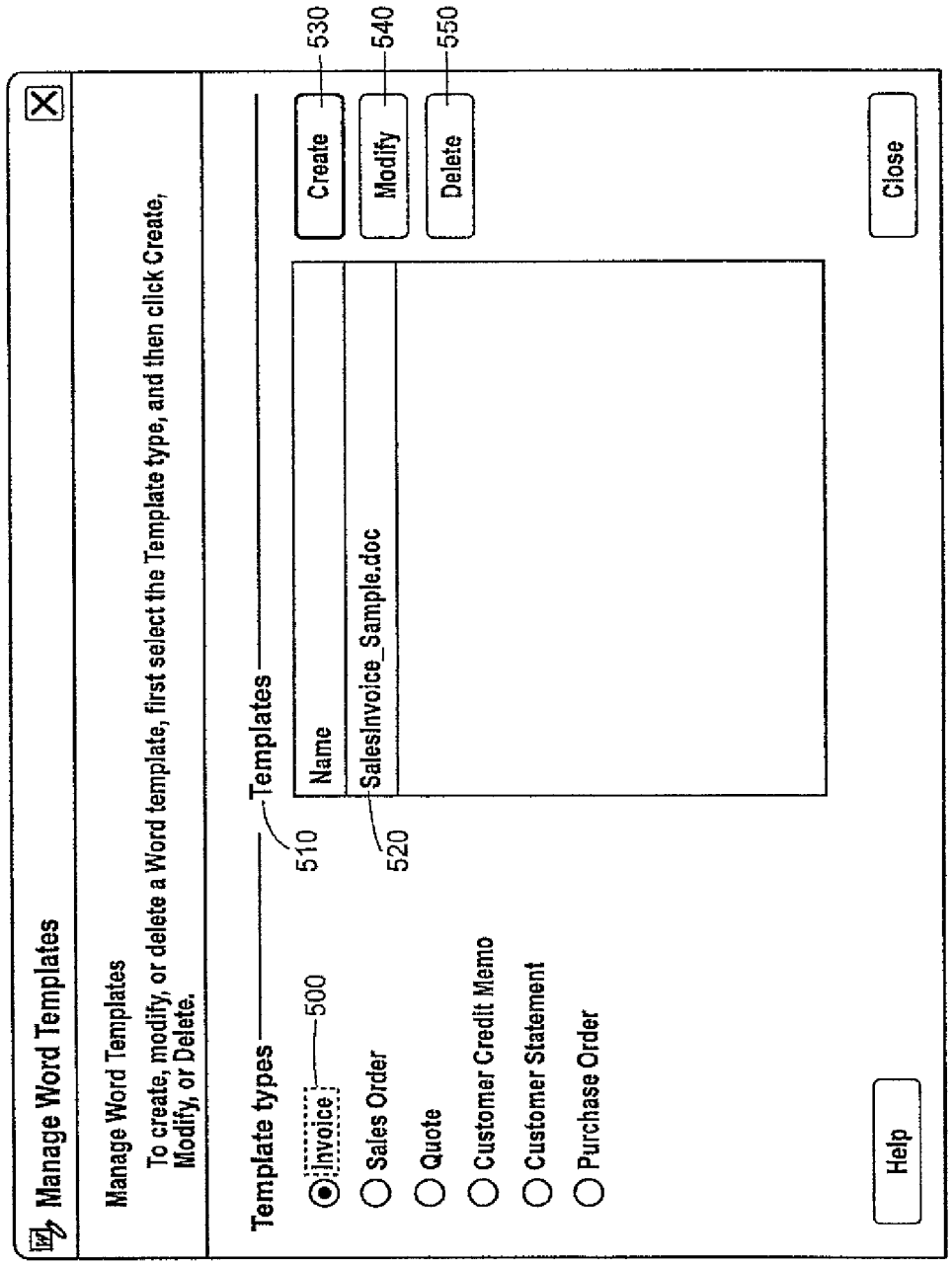
FIG. 5 is an illustration of an embodiment of a template management display.

Users may also be permitted to edit templates that are communicated to the word processor. FIG. 5 illustrates the ability to select this option. For example, the user may select Invoice 500 and under the heading "Templates" 510 all the current Invoice Templates may be displayed 520. In this example, there is only one template 520, the SalesInvoice_Sample.doc, but there can be more than one template 520. The user may be present the option to create a template 530, modify a template 540 or delete a template 550. If a user selects to modify a template, a screen such as in FIG. 3 may be displayed.

Referring to FIG. 3, a sample template is displayed. A number of potential fields 350 which may be added to a template are displayed, in this example, in a column. A user can select one of these fields 350 and it will be added to the template. In addition, a user can select an existing field such as ContactName 310, CustomerName 320, and BillingAddress 330 and can move these fields to a different location on the invoice, can remove them from the invoice or perform any other common word processing operation.

Figure 6:
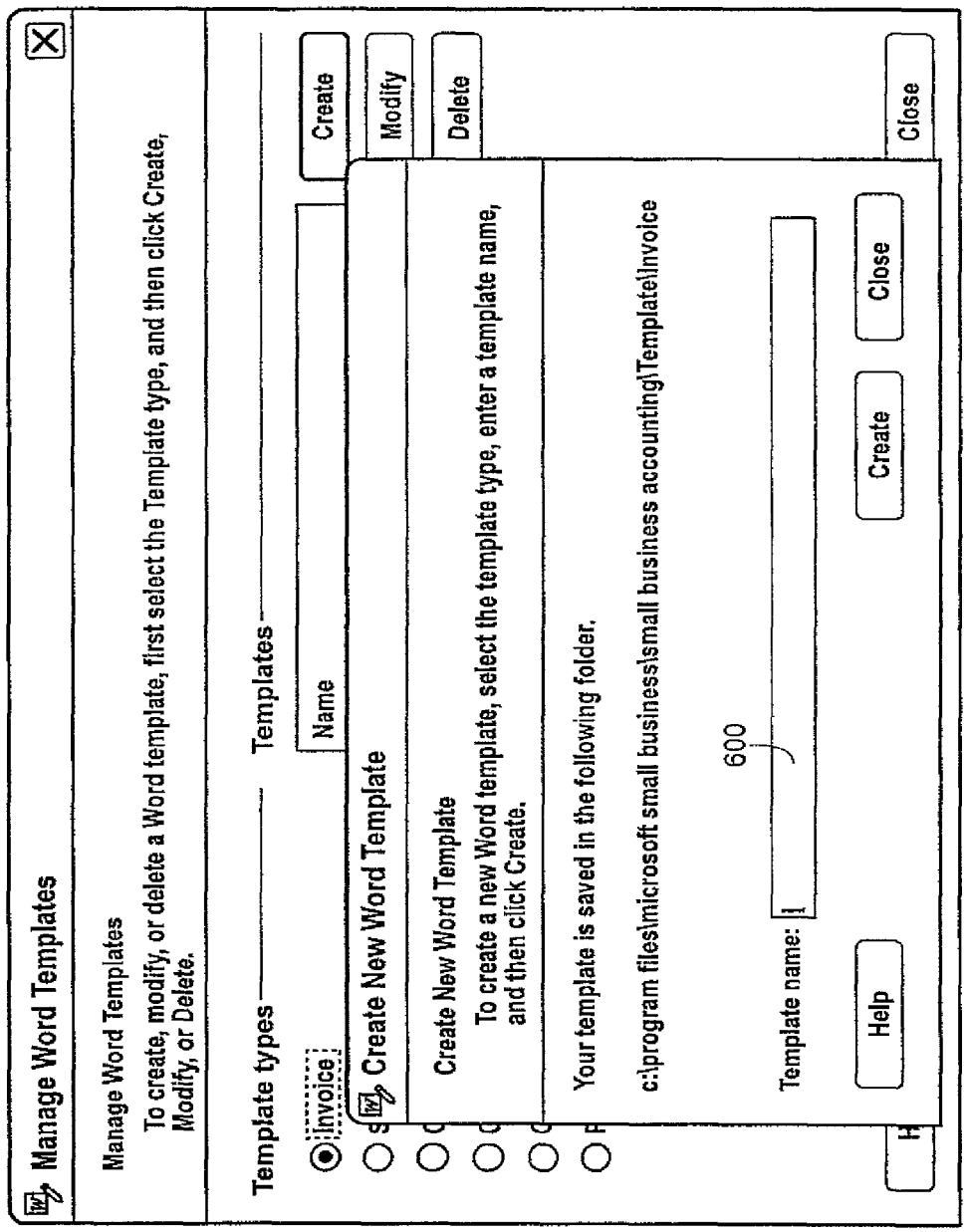
FIG. 6 is an illustration of an embodiment of a create new template display.

In a similar manner, a user may be able to create entirely new templates. Referring to FIG. 5, a user would select to create a new template 530. Referring to FIG. 6, a user then may be asked to name 600 the new template. Referring to FIG. 3, a similar screen would be displayed to the user, except that there would be no fields displayed on the screen. However, a user could select from a list of available field 350 and add them to a template to create a new template. In addition, the user can modify an existing template to create a new template. Further, a user can add all the functions and features available in a word processing program. For example, a user could add a clip art file to the invoice, could add different fonts to an invoice, etc.

The user may also be able to open a word processing version of a saved financial document and the word processing program may refer back to the accounting program to update the data displayed in the financial document. For example, if a user saved a prepared invoice as invoice123 (invoice123.doc), for example, at a point in the future, the user could open up invoice123.doc and the fields in invoice123.doc may be automatically updated. As an example, say a vendor mailed invoice123.doc and later the customer of invoice123.doc moved and obtained a new telephone number. This new address and telephone number of the customer may be added and stored in the accounting program.

At some point in the future, the vendor may open up invoice123.doc in order to discuss a dispute relating to the invoice. Upon opening the invoice, the word processor may refer back to the accounting program to determine whether any of the data in the displayed fields has been updated. If the data in the displayed field has been updated (such as the updated address and telephone number), the new address and telephone number of the client may be displayed on the invoice. In an alternate embodiment, the user will be presented an option to have the fields updated with the current information in the accounting program. In yet another alternative, the user will be presented the option to accept the version of the data that was stored with the word processing document or the most recent version in the accounting program.

Figure 7:
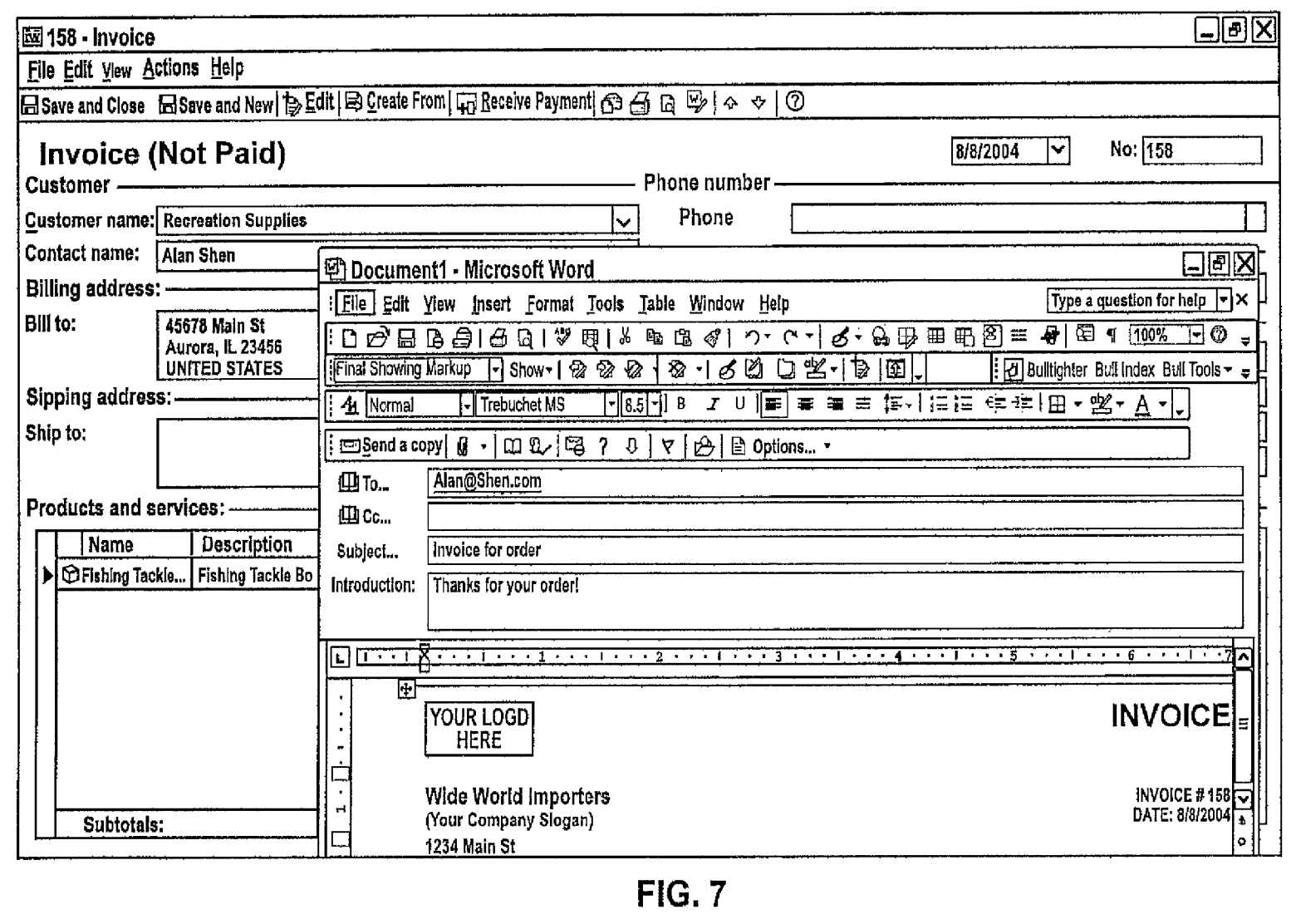

The user may select to communicate a financial document, such as email the document, fax the document, communicate the document to a printer, communicate the document to a web site, etc. The program may recognize that the financial document has a related template and the program may communicate the document using the template in the word processing program. For example, a user may be using the accounting program and may select to print an invoice. The invoice may have a selected template associated with the invoice. By using the template additional features available by using a word processor may be utilized. For example, many accounting programs may have a limited selection of fonts that can be used on an invoice where the fonts available to a modern word processor may be quite numerous. By simply selecting to print the invoice, the program may forward the invoice template and the relevant invoice data to the word processor, which may then format the data and print the invoice. By using the word processor, superior printing results and options may be obtained. As can be seen in FIG. 7, the invoice in the email looks virtually identical to the email in the FIG. 4 which makes sense as both are using the word processor to format the template and the data in the relevant fields.

In addition, the word processor may work entirely in the background of the program. For example, the user may never see a word processor begin execution, format the template and the received data, display the data and then print the data. The word processing program may work entirely in the memory and processor of the computer and there may be no visual indication to the user that a word processor was involved with communicating the document.

Although many of the descriptions herein have focused on invoices, other financial documents may also benefit from such a program. For example, virtually any financial report from the accounting program could have an improve visual appearance if a template and data were sent to a word processor where the resulting document could be easily formatted in the hopes of creating a more visually appealing and useful document. Datasheet for customers, vendors, employees, items or services also could benefit as could item receipts, vendor credit memos, cash sales, cash purchases, phantom checks (check for record keeping purposes), customer payment receipts, timesheets, time entries, vendor bills, journal entries, credit card charges, deposit slips, fund transfers, etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A computing system comprising:
a computer processor configured to:
receive a selection of a template;
identify a data field in the template, the data field indicating financial data to fill in the data field;
retrieve the financial data for the data field from stored financial data;
generate a document according to the selected template, the document having the financial data within the data field; and
receive a command to print the document through a first program other than a word processor program and, in response, printing the document using the word processor program that operates in a background of the first program.

2. The computing system of claim 1, wherein the data field is specified by eXtensible Markup Language (XML).

3. The computing system of claim 1, wherein the document comprises at least one of a word processing document and a spreadsheet document.

4. The computing system of claim 1, wherein the first program comprises a financial program.

5. The computing system of claim 4, further configured to:
display the financial data in the word processor program;
receive a modification to the financial data; and
communicate the modification to the financial program.

6. The computing system of claim 5, further configured to:
modify existing templates in the financial program based on user input.

7. The computing system of claim 6, further configured to:
create templates in the financial program based on user input.

8. The computing system of claim 4, wherein printing comprises:
receiving a command to print the document through the financial program and, in response, initiating a printing process in which the word processor program operates internally and is not visible to a user.

9. A computer readable storage medium storing computer executable instructions which, when executed by the computer, perform a method, the method comprising:
receiving a selection of a template in a financial program;
identifying a data field in the template, the data field indicating financial data to fill in the data field;
retrieving the financial data for the data field from stored financial data in the financial program; and
generating a word processing program document according to the selected template, the document having the financial data within the data field.

10. The computer readable storage medium of claim 9, wherein the data field is specified by eXtensible Markup Language (XML).

11. The computer readable storage medium of claim 9, the method further comprising:
display the financial data in a word processor; and
receive a modification to the displayed financial data.

12. The computer readable storage medium of claim 11, the method further comprising:
communicate the modification to the financial program.

13. The computer readable storage medium of claim 9, the method further comprising:
modify existing templates in the financial program based on user input.

14. The computer readable storage medium of claim 9, wherein the financial program comprises an accounting program.

15. The computer readable storage medium of claim 9, wherein the method comprises:
saving the word processing program document as a saved financial document including the financial data;
receiving a command to open the saved financial document and opening the saved financial document in the word processing program; and
in response, automatically updating the financial data in the financial document using data obtained from the financial program.

16. The computer readable storage medium of claim 15, wherein the financial data is automatically updated using the selected template.

17. A computer-implemented method for modifying a template in a financial program, the method comprising:
receiving a selection of a financial template in a financial program, the financial template having one or more data fields for receiving financial data;
displaying the selected financial template including the one or more data fields in a user interface of a word processing program;
receiving inputs to modify the selected template through the user interface of the word processing program using a computer processor; and
modifying the template in the financial program based on the inputs.

18. The computer-implemented method of claim 17, the method further comprising:
providing one or more template modification controls in the user interface.

19. The computer-implemented method of claim 17, the method further comprising:
identify a data field in the template, the data field indicating financial data to fill in the data field;
retrieve the financial or accounting data for the data field from stored data; and
generate a document according to the selected template, the document having the financial or accounting data within the data field.

20. The computer-implemented method of claim 17, wherein the financial program comprises an accounting program.

* * * * *